United States Patent [19]
Robison

[11] Patent Number: 5,921,562
[45] Date of Patent: Jul. 13, 1999

[54] MAGNETIC CHUCK ASSEMBLY

[76] Inventor: Troy Robison, 9 Crestview, Ingleside, Ill. 60041

[21] Appl. No.: 09/013,996

[22] Filed: Jan. 27, 1998

[51] Int. Cl.[6] .............................. B23B 51/12; B25B 21/00
[52] U.S. Cl. ................................. 279/128; 7/165; 81/439; 279/145; 408/239 A
[58] Field of Search ........................... 279/128, 143–145; 81/125, 439; 7/158, 165; 408/239 A

[56] References Cited

U.S. PATENT DOCUMENTS

| | | | |
|---|---|---|---|
| 2,828,131 | 3/1958 | Appleby | 279/128 |
| 3,970,407 | 7/1976 | Uffman | 408/204 |
| 4,514,117 | 4/1985 | Scott | 408/239 R |
| 4,692,073 | 9/1987 | Martindell . | |
| 4,796,319 | 1/1989 | Taft | 7/158 |
| 4,900,202 | 2/1990 | Wienhold . | |
| 4,995,768 | 2/1991 | Craft | 279/128 |
| 5,013,194 | 5/1991 | Wienhold . | |
| 5,061,123 | 10/1991 | Broussard | 408/67 |
| 5,191,666 | 3/1993 | Corbin | 7/158 |
| 5,193,824 | 3/1993 | Salpaka | 279/144 |
| 5,409,333 | 4/1995 | Hu | 408/239 A |
| 5,577,426 | 11/1996 | Eggert et al. | 81/439 |
| 5,603,248 | 2/1997 | Eggert et al. | 81/438 |
| 5,651,647 | 7/1997 | Ray | 81/439 |

*Primary Examiner*—Steven C. Bishop
*Attorney, Agent, or Firm*—Thomas R. Vigil

[57] ABSTRACT

The magnetic chuck assembly includes a conventional chuck having structure for imparting a torque to a tool holder; a magnetic tool holder having mating structure for engaging the structure on the chuck; and the magnetic tool holder further having magnet structure for holding a tool to the magnetic tool holder and for holding the magnetic tool holder to the chuck.

21 Claims, 2 Drawing Sheets

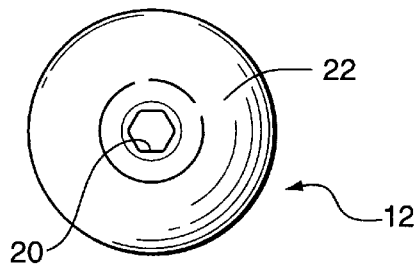
FIG. 2
FIG. 3
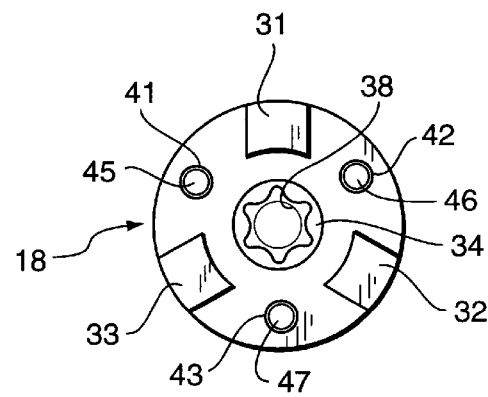
FIG. 4
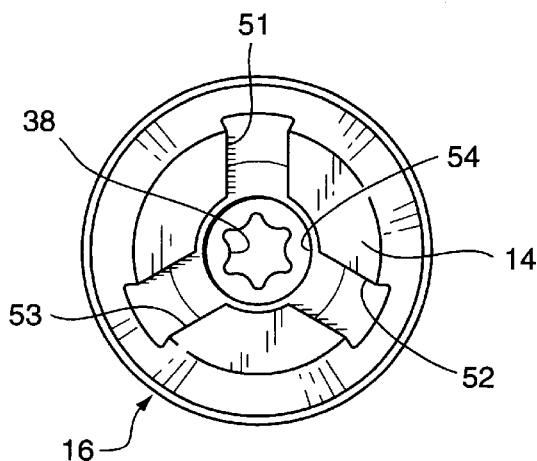
FIG. 5
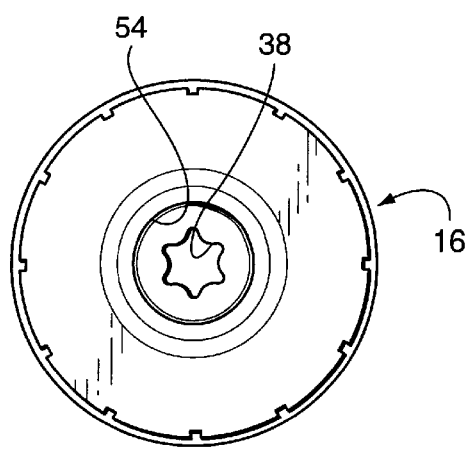
FIG. 6

MAGNETIC CHUCK ASSEMBLY

BACKGROUND OF THE INVENTION

1. Field of the Invention

The present invention is directed to a quick mounting of and a quick release of a tool from a magnetic chuck, tool mounting assembly using a combined magnetic and mechanical coupling.

2. Description of the Prior Art

Heretofore, several tool mounting assemblies for mounting a working tool at the end of a power drill or hand drill where magnets are used to hold the tool to a tool holder have been proposed. Examples of such previously proposed assemblies for magnetically mounting a tool to a power drill or hand drill are disclosed in the following U.S. Patents:

| U.S. Pat. No. | Patentee |
| --- | --- |
| 3,970,407 | Uffman |
| 4,514,117 | Scott |
| 5,577,426 | Eggert et al |
| 5,603,248 | Eggert et al |

The Uffman, U.S. Pat. No. 3,970,407 teaches a rotary cutter. The rotary cutter includes a holder assembly including a cup shaped body that has a stem extending from the bottom of the cup for being mounted in a chuck of a power tool. Inside the cup shaped portion is a generally cylindrical, magnet slug which has a diametrical slot extending across the outer facing end of the slug and which is held inside the cup shaped portion by a screw which extends through a bottom of the slot upwardly through the slug and into the stem. Then, a circular cutter has a reduced-in-diameter collar that fits within the hollow defined by the cup shaped body and bares against the exposed surface of the magnetic slug and is held to the slug by the magnetic attraction between the rotary cutter and the slug. Also, the inner end of the reduced-in-diameter collar of the circular cutter has two (2) diametrically opposed projections which are received in the slot so that a turning force of torque can be applied to the rotary cutter by reason of the engagement between the projections and the slot.

The Scott U.S. Pat. No. 4,514,117 teaches a quick-change tool holder and tool. The tool holder is generally cylinder in shape and includes a threaded bore at the rear end thereof for being threaded onto an adapter shaft which is adapted to be received into and held in a chuck. A tool, such as a drill has a tapered or conically shaped base and the cylindrical tool holder has a conical shaped outer opening for receiving the base of the tool. Between the tapered shank or base of the tool and the conically shaped opening there is provided a keyway in the form of an axially extending slot in the wall of the conically shaped opening which is aligned with an axially extending snot in the outer wall surface of the tapered base of the tool for receiving a magnet key. The magnet function of the key retains the ferromagnetic tapered shank within the tapered bore portion in the tool holder and facilitates easy removal of the drill bit tool from the tool holder.

The Eggert et al U.S. Pat. Nos. 5,577,426 and 5,603,248 disclose a hand held tool with a magnetic bit holder. As shown in FIG. 2 of this patent, a hex cross section base of a tool, such as a Phillips head screw driver is received within bore having a hex configuration. At the bottom of the bore there is positioned a permanent magnet which is held in the bottom of the bore by retainer plate. The tool holder includes a stem that extends to a handle for manual manipulation, e.g., rotation, of the tool mounted in the tool holder.

SUMMARY OF THE INVENTION

According to the present invention there is provided a magnetic chuck assembly including a conventional chuck having structure for imparting a torque to a tool holder; a magnetic tool holder having mating structure for engaging the structure on the chuck; and the magnetic tool holder further having holding structure for holding a tool to the magnetic tool holder and magnet structure for holding the magnetic tool holder to the chuck.

BRIEF DESCRIPTION OF THE DRAWINGS

FIG. 2 is an end view of a hex based tool, such as a Phillips screwdriver, which is received into a front end of a magnetic tool holder of the magnetic chuck assembly shown in FIG. 1.

FIG. 3 is an end view of the mushroom shaped front end of the magnetic tool holder of the magnetic chuck assembly.

FIG. 4 is an end view of a stem portion of the magnetic tool holder of the magnetic chuck assembly and is taken along line 4—4 of FIG. 1.

FIG. 5 is taken along line 5—5 of FIG. 1 and shows the front end surface of a keyless chuck.

FIG. 6 is taken along the line of 6—6 of FIG. 1 and is a rear end view of the keyless chuck.

DESCRIPTION OF THE PREFERRED EMBODIMENT(S)

Figure 1:
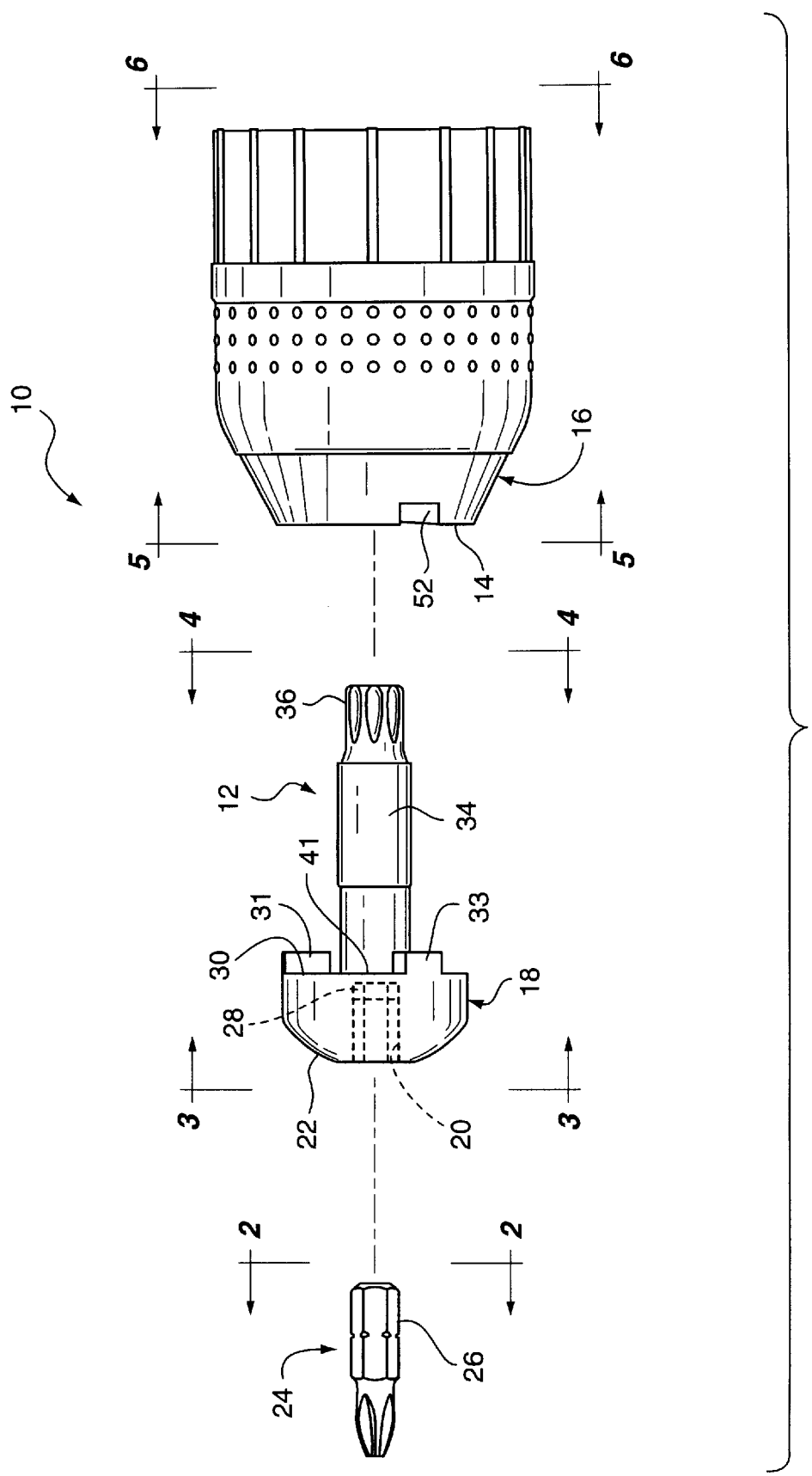
FIG. 1 is an exploded side elevational view of the magnetic chuck assembly of the present invention.

Referring now to FIG. 1 in greater detail, there is illustrated therein a magnetic chuck assembly 10 of the present invention which includes a mushroom shaped magnetic tool holder 12 which is specially configured for being mounted to a specially configured front end face 14 of a keyless chuck 16 which can be of the type made and sold by Jacobs Chuck Technology Corporation of Wilmington, Del.

As best shown in FIGS. 1, 3 and 4, the magnetic tool holder 12 of the magnetic chuck assembly 10 of the present invention includes a mushroom shaped front end or generally cylindrical body 18 which has a central opening 20 in a front face 22 thereof which can be specially configured for receiving and holding a tool 24 therein. In the illustrated embodiment, the opening 20 has a hex cross section for receiving a hex in cross section base 26 of the tool 24 as shown in FIG. 1. At the bottom of the opening 20, as shown in phantom in FIG. 1, is a magnet 28 which is utilized to hold the tool 24 which, in the illustrated embodiment, is a Phillips head screwdriver and which can be a drill bit or a flathead screwdriver.

While a magnet 28 is preferred for holding a tool in view of its simplicity and low cost, other tool holding mechanisms can be used, e.g. the tool holders disclosed in U.S. Pat No. 4,692,073 or U.S. Pat. No. 4,900,202.

On the other or back side 30 of the mushroom shaped front end 18 are three (3) projections or bosses 31, 32 and 33 which are located approximately 120° from each other on and around the back side 30 of the front end 18. Extending rearwardly and centrally from the back side 30 is a stem 34 which has, at its rear end, a spline configuration 36 in a star shape, as shown in FIG. 4. The star shaped hex spline end 36 can be constructed and designed to be received in a hex star opening 38 (FIG. 5) within the keyless chuck 16.

Further, according to the teachings of the present invention magnetic mounting structure is provided. Thus, equally spaced around the annular back side or face 30 of the front end 18 are three (3) shallow pockets or cavities 41, 42 and 43 which, in the illustrated embodiment, are circular in shape and have a shallow depth. These pockets 41–43 are adapted to receive, respectively, three (3) circular or disc shaped or button shaped magnets 45, 46 and 47. The magnets 45–47 are fixed in the pockets 41–43 and are adapted to hold the magnetic tool holder 12 against the front end face 14 of the keyless chuck 16.

The front end face 14 of the keyless chuck 16 has formed therein three (3) notches or slots 51–53 equally arcuately spaced apart as shown in FIG. 5. These notches 51–53 are adapted to receive and engage the projections or bosses 31–33 on the back side 18 the mushroom shaped front end 18 as shown in FIGS. 1 and 4. In this way, the magnetic tool holder is held by the magnets 45–47 to the outer end face 14 of the keyless chuck 16 which is made of magnetizable metal, with the bosses or projections 31–33 received in the notches or slots 51–53 to provide a driving connection between the magnetic tool holder 12 and the front end face 14 of the keyless chuck 16.

Then, of course, a tool such as a Phillips screwdriver 24 is received in the hex opening 20 in the front end face 22 of the mushroom shaped front end 18 of the magnetic tool holder 12 and held therein by the magnet 28.

It will be understood that the star shaped proximal end 36 of the stem 34 can be omitted and only provides a further driving connection between the tool holder 12 and a Jacobs keyless chuck of the type shown in FIG. 1 when the stem 34 is inserted into a bore 54 in the keyless chuck 16 and into engagement with the star hex opening.

The magnetic chuck assembly 10 including the magnetic tool holder 12 and the specially configured front end face 14 of a metal part of the keyless chuck 16 in cooperation with a tool, such as the Phillips head tool 24, provide a very simple and quick way of mounting different types of tools of different sizes and shapes to a front face 14 of a keyless chuck 16. In this way, once the keyless chuck 16 is mounted on a power drill there is no need to twist or untwist the keyless chuck 16 for inserting different tools into the magnetic chuck assembly 20. Instead, the magnetic tool holder 12 is inserted into the keyless chuck 16 and the workman is "ready to go".

Since no magnets are provided within the bore 54 of the keyless chuck there is no collecting of metal grit or debris. Any debris that collects on the front or back of the magnetic tool holder 12 or in the opening 20 can be easily cleaned off.

Further, it is to be appreciated that once the magnetic tool holder 12 is mounted to the specially configured front end face 14 of the metal part of the keyless chuck 16, the user of the magnetic chuck assembly 10 only needs to replace the tool 24 at the front end of the mushroom shaped front end 18 of the magnetic tool holder 12 and does not need to twist or untwist the keyless chuck. Simply stated, all the user of the magnetic chuck assembly 10 needs to do is replace the tool 24.

From the foregoing description it will be apparent that the magnetic chuck assembly 10 of the present invention and in particular the magnetic tool holder 12 have a number of advantages, some of which have been described above and others of which are inherent in the invention. Also, it will be understood that modifications can be made to the magnetic chuck assembly 10 of the present invention without departing from the teachings of the present invention. For example one can provide an assembly 10 that does not have the projections 31–33 and the slots 51–53 and rely only on the magnets 45–47 and the spline end 36 engaging the star shaped hole 38 or omit the spline end 36 and rely only on the magnets 45–47 and the engagement of the projections 31–33 in the slots 51–53. Accordingly, the scope of the present invention is only to be limited as is necessitated by the accompanying claims.

I claim:

1. A magnetic chuck assembly including a conventional chuck having a stem receiving opening and having structure for imparting a torque to a tool holder; a magnetic tool holder having a stem and having mating structure for engaging said structure on said chuck; and said magnetic tool holder further having holding means for holding a tool to said magnetic tool holder and magnetic means within said tool holder for holding said magnetic tool holder to said chuck.

2. The magnetic chuck assembly of claim 1 wherein said magnetic tool holder includes an opening in a front end thereof and said holding means include a magnet at an inner end of said opening in said front end for holding the tool in said front end of said magnetic tool holder.

3. The magnetic chuck assembly of claim 2 wherein said opening in said front end of said magnetic tool holder has a multi sided configuration.

4. The magnetic chuck assembly of claim 3 wherein said multi sided configuration can be any configuration between a triangle and an octagon.

5. The magnetic chuck assembly of claim 4 wherein the cross section of said opening and of a base of the tool is a hexagon.

6. The magnetic chuck assembly of claim 5 wherein the tool received in said tool holder is one of a Phillips screwdriver, a straight edge screwdriver or a drill.

7. A magnetic chuck assembly including a conventional chuck having a stem receiving opening and having structure thereon or therein for imparting a torque to a tool holder; a magnetic tool holder having a stem and having mating structure for engaging said structure on said chuck; said magnetic tool holder further having holding means for holding a tool to said magnetic tool holder and magnet means associated with said tool holder for holding said magnetic tool holder to said chuck, said structure on or in said chuck comprising at least one slot in a front face of said chuck and said mating structure on said magnetic tool holder comprising at least one rearwardly extending projection on a rearwardly facing side of a body of said magnetic tool holder.

8. The magnetic chuck assembly of claim 7 wherein said structure on or in said chuck comprises three equally arcuately spaced slots in said front face of said chuck and said mating structure comprises three projections spaced 120° from each other on and around said rearwardly facing side of said body of said tool holder.

9. The magnetic chuck assembly of claim 8 wherein said magnetic means includes at least one magnet mounted in a pocket or cavity formed in said rearwardly facing side of said tool holder body.

10. The magnetic chuck assembly of claim 9 wherein said magnetic means includes three equally spaced pockets or cavities formed in said rearwardly facing side of said tool holder body and a magnetic mounted in each one of said cavities.

11. The magnetic chuck assembly of claim 10 wherein said cavities are shallow, cylinder cavities and said magnets are circular disc shaped magnets.

12. The magnetic chuck assembly of claim 7, wherein said holding means include a magnet in said tool holder for magnetically holding a tool to said tool holder.

13. A magnetic chuck assembly including a conventional chuck having structure thereon or therein for imparting a torque to a tool holder; a tool holder having mating structure for engaging said structure on said chuck; said magnetic tool holder further having holding means for holding a tool to said magnetic tool holder and magnet means associated with said tool holder for holding said magnetic tool holder to said chuck; said magnetic tool holder including a body portion and a stem portion, said stem portion extending rearwardly from a rearwardly facing side of said body portion for being received within a conventional opening in a chuck; a proximate end of said stem portion having a special configuration which is one of a multi-sided configuration or a spline type configuration, and defines, at least in part, said mating structure for mating with a similar configuration at the inner end of said opening in said chuck which defines, at least in part, said structure on or in said chuck.

14. The magnetic assembly of claim 13 wherein said special configuration is one of a star configuration or a spline configuration.

15. The magnetic chuck assembly of claim 13 wherein said holding means includes a magnet in said tool holder for magnetically holding a tool to said tool holder.

16. The magnetic chuck assembly of claim 13 wherein said magnet means includes at least one magnet in said tool holder for holding said tool holder to said chuck.

17. The magnetic chuck assembly of claim 13 wherein said structure on or in said chuck comprises at least one slot in a front face of said chuck and said mating structure on said magnetic tool holder comprises at least one rearwardly extending projection on said rearwardly facing side of said body portion of said magnetic tool holder.

18. The magnetic chuck assembly of claim 17 wherein said structure in said chuck comprises three equally, arcuately spaced slots on said front face of said chuck and said mating structure comprises three projections spaced 120° from each other on and around said rearwardly facing side of said body portion of said magnetic tool holder.

19. The magnetic chuck assembly of claim 18 wherein said magnetic means includes at least one magnet mounted in a pocket or cavity formed in said rearwardly facing side of said body portion of said magnetic tool holder.

20. The magnetic chuck assembly of claim 19 wherein said magnetic means includes three equally spaced pockets or cavities formed in said rearwardly facing side of said magnetic tool holder body portion and a magnet mounted in each one of said cavities.

21. The magnetic chuck assembly of claim 20 wherein said cavities are shallow, cylinder cavities and said magnets are circular disc shaped magnets.

* * * * *